(12) United States Patent
Schaefer et al.

(10) Patent No.: US 10,393,168 B2
(45) Date of Patent: Aug. 27, 2019

(54) SECURING ASSEMBLY

(71) Applicant: iSee Store Innovations, L.L.C., St. Louis, MO (US)

(72) Inventors: Mark Schaefer, Town and Country, MO (US); Steven Allen Brenner, Richmond Heights, MO (US); Sesha Madireddi, St. Charles, MO (US); Sivateja Kasireddi, Maryland Heights, MO (US)

(73) Assignee: iSee Store Innovations, LLC, St. Louis, MO (US)

( * ) Notice: Subject to any disclaimer, the term of this patent is extended or adjusted under 35 U.S.C. 154(b) by 0 days.

(21) Appl. No.: 16/052,822

(22) Filed: Aug. 2, 2018

(65) Prior Publication Data
US 2018/0355906 A1   Dec. 13, 2018

Related U.S. Application Data (63) Continuation-in-part of application No. 14/623,679, filed on Feb. 17, 2015, now Pat. No. 10,104,986.

(60) Provisional application No. 61/949,679, filed on Mar. 7, 2014, provisional application No. 62/060,223, filed on Oct. 6, 2014.

(51) Int. Cl.
*F16B 47/00* (2006.01)

(52) U.S. Cl.
CPC .................... *F16B 47/00* (2013.01)

(58) Field of Classification Search
CPC .. A47F 5/08; A47F 7/283; A47F 7/285; F16B 47/00

USPC ........................................................ 248/313
See application file for complete search history.

(56) References Cited

U.S. PATENT DOCUMENTS

| | | | | |
|---|---|---|---|---|
| 2,657,893 A * | 11/1953 | Puckert | ................. | B60R 13/105 248/205.8 |
| 2,940,713 A * | 6/1960 | Van Dusen | ............. | F16B 47/00 248/205.1 |
| 4,133,575 A * | 1/1979 | Mader | ........................ | B60J 1/20 248/205.8 |
| 5,104,077 A * | 4/1992 | Liu | ........................ | F16B 47/00 248/205.8 |
| 5,318,262 A * | 6/1994 | Adams | ..................... | F16B 47/00 248/205.8 |
| 6,478,271 B1 * | 11/2002 | Mulholland | ............ | F16B 47/00 248/205.8 |
| 6,502,794 B1 * | 1/2003 | Ting | ........................ | E03C 1/06 248/205.5 |
| 6,666,420 B1 * | 12/2003 | Carnevali | ................ | F16B 47/00 248/205.8 |
| 6,669,033 B1 * | 12/2003 | Lian | ........................ | F16B 47/00 211/106 |
| 6,942,188 B2 * | 9/2005 | Tsay | ........................ | F16B 47/00 248/205.5 |
| 6,966,530 B2 * | 11/2005 | Hsu | ........................... | F16B 7/10 248/205.5 |
| 7,458,541 B1 * | 12/2008 | Chang | ................ | A47K 10/3836 242/591 |

(Continued)

*Primary Examiner* — Stanton L Krycinski
(74) *Attorney, Agent, or Firm* — Joseph M. Butscher; The Small Patent Law Group, LLC (57) ABSTRACT

A securing assembly is configured to removably secure a structure to a surface of a component. The securing assembly includes a suction cup, a locking member coupled to the suction cup, and a suction securing nut coupled to the suction cup and the locking member.

18 Claims, 10 Drawing Sheets

(56) References Cited

U.S. PATENT DOCUMENTS

| | | | | |
|---|---|---|---|---|
| 7,708,245 B2* | 5/2010 | Woo | .......................... | G09F 7/12 |
| | | | | 248/205.7 |
| 7,793,899 B2* | 9/2010 | Fan | ...................... | F16B 47/006 |
| | | | | 248/206.2 |
| 7,850,133 B2* | 12/2010 | Carnevali | ............... | F16B 47/00 |
| | | | | 248/205.5 |
| 8,079,557 B2* | 12/2011 | Tu | ......................... | F16B 47/006 |
| | | | | 248/206.2 |
| 9,200,667 B1* | 12/2015 | Hsu | ........................ | F16M 13/02 |
| 9,404,526 B2* | 8/2016 | Huang | .................... | F16B 47/00 |
| 9,410,571 B2* | 8/2016 | Yang | ....................... | F16B 47/00 |
| 2008/0308693 A1* | 12/2008 | Kim | ........................ | A47G 29/08 |
| | | | | 248/205.8 |
| 2014/0374553 A1* | 12/2014 | Park | ........................ | F16B 47/00 |
| | | | | 248/205.5 |
| 2015/0240862 A1* | 8/2015 | Shi | .......................... | F16B 47/00 |
| | | | | 248/205.8 |
| 2015/0369276 A1* | 12/2015 | Balmer | ................... | F16B 47/00 |
| | | | | 248/205.8 |
| 2016/0201714 A1* | 7/2016 | Zhang | .................... | F16B 47/00 |
| | | | | 248/206.2 |
| 2016/0215813 A1* | 7/2016 | Huang | ................. | F16B 47/006 |

\* cited by examiner

SECURING ASSEMBLY

RELATED APPLICATIONS

This application is a continuation-in-part of U.S. patent application Ser. No. 14/623,679 entitled "Systems and Methods for Securing and Displaying Products," filed Feb. 17, 2015, which relates to and claims priority benefits from (1) U.S. Provisional Patent Application No. 61/949,679 entitled "Systems and Methods for Holding Beverage Containers," filed Mar. 7, 2014, and (2) U.S. Provisional Patent Application No. 62/060,223 entitled "Systems and Methods for Securing and Displaying Products," filed Oct. 6, 2014.

Each of U.S. patent application Ser. No. 14/623,679, U.S. Provisional Patent Application No. 61/949,679, and U.S. Provisional Patent Application No. 62/060,223 is hereby incorporated by reference in its entirety.

FIELD OF EMBODIMENTS OF THE DISCLOSURE

Embodiments of the present disclosure generally relate to securing assemblies, which may be used to removably secure to a structure.

BACKGROUND OF THE DISCLOSURE

Suction cups may be used to adhere to surfaces of structures. For example, a suction cup may removably secure to a glass surface of a door of a refrigerated compartment.

One or more suction cups may be used to secure a component, such as a product display system, to a surface of a structure, such as a glass door of a refrigerated compartment. However, various known suction cups may move or slide relative to the surface of the component, such as if a force of sufficient magnitude is applied to the suction cup. For example, if a product display system retains a sufficient amount of products, the overall weight of the product display system may cause the suction cups to slide down the surface of the structure, or even dislodge therefrom.

SUMMARY OF THE DISCLOSURE

A need exists for a more robust suction cup. Further, a need exists for a suction cup that provides a more reliable and stronger coupling to a surface of a structure.

With those needs in mind, certain embodiments of the present disclosure provide a securing assembly that configured to removably secure a structure to a surface of a component. The securing assembly includes a suction cup, a locking member coupled to the suction cup, and a suction securing nut coupled to the suction cup and the locking member. In at least one embodiment, the locking member is a locking ring. Rotation of the suction securing nut into a securing relationship with the suction cup urges a first portion of the locking member into a second portion of the suction cup and increases a suctioning securing force exerted into the surface of the component by the suctioning base. The first portion may be a beveled rim, and the second portion may be an annular lip of a suctioning base. The locking member may be between the suction cup and the suction securing nut.

In at least one embodiment, the suction cup includes a stem having a first threaded surface. The suction securing nut includes an outer shroud having an outer circumferential wall connected to an outer cap, and an interior connecting tube having a second threaded surface that is configured to threadably engage the first threaded surface of the stem. The stem may include one or more keying members.

In at least one embodiment, the suction cup includes a suctioning base integrally connected to a stem extending from the suctioning base. The suctioning base includes an outer annular lip surrounding a flattened interior circular body. The stem includes a cylindrical shaft surrounding a central channel that extends to the suctioning base. An outer surface of the shaft includes threads that are configured to threadably engage interior threads of the suction securing nut.

The locking member may be a locking ring that includes an annular outer rim, and a beveled rim extending downwardly from the outer rim. An inboard support base may connect to the beveled rim through an interior rim. An interior groove is formed between the outer rim, the beveled rim, and the interior rim. An interior upstanding annular wall may be connected to the interior rim. An interior ledge may inwardly extend from the interior upstanding annular wall. The interior ledge may include a plurality of peaks and a plurality of valleys.

In at least one embodiment, the locking member fits over the suction cup such that a stem of the suction cup passes through a passage of the locking member.

The suction securing nut may include an outer shroud having an outer circumferential wall connected to an outer cap, and an interior connecting tube extending inwardly from an interior surface of the cap. The interior connecting tube includes an interior threaded surface surrounding a central chamber. An outer channel is defined between the wall and the interior connecting tube. The interior threaded surface is configured to threadably engage an exterior threaded surface of a stem of the suction cup.

A lower edge of the interior connecting tube may extend below a lower surface of the outer circumferential wall. The lower edge of the interior connecting tube may include a plurality of peaks and a plurality of valleys.

DETAILED DESCRIPTION OF THE DISCLOSURE

The foregoing summary, as well as the following detailed description of certain embodiments will be better understood when read in conjunction with the appended drawings. As used herein, an element or step recited in the singular and proceeded with the word "a" or "an" should be understood as not excluding plural of the elements or steps, unless such exclusion is explicitly stated. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide a securing assembly that includes a suction cup that may be secured to a bracket via a threaded knob that passes through an opening of the main body and is accepted by a nut. The tightening of the nut may act to pull the main body (or a portion thereof) on to the suction cup, and may serve to increase the suction provided by the suction cup. The nut and threaded knob may be coupled via a ratcheting or other torque limiting mechanism to prevent over-tightening.

In at least one embodiment, the securing assembly includes a suction cup, a locking ring, and a suction securing nut. The locking ring is disposed between the suction cup and the suction securing nut. As the suction securing nut is tightened, the suction securing nut exerts a force into the locking ring, which causes the suction cup to exert an increased securing force into a surface of a component, thereby minimizing, preventing, or otherwise reducing movement of the securing assembly in relation to the surface of the component.

Figure 1:
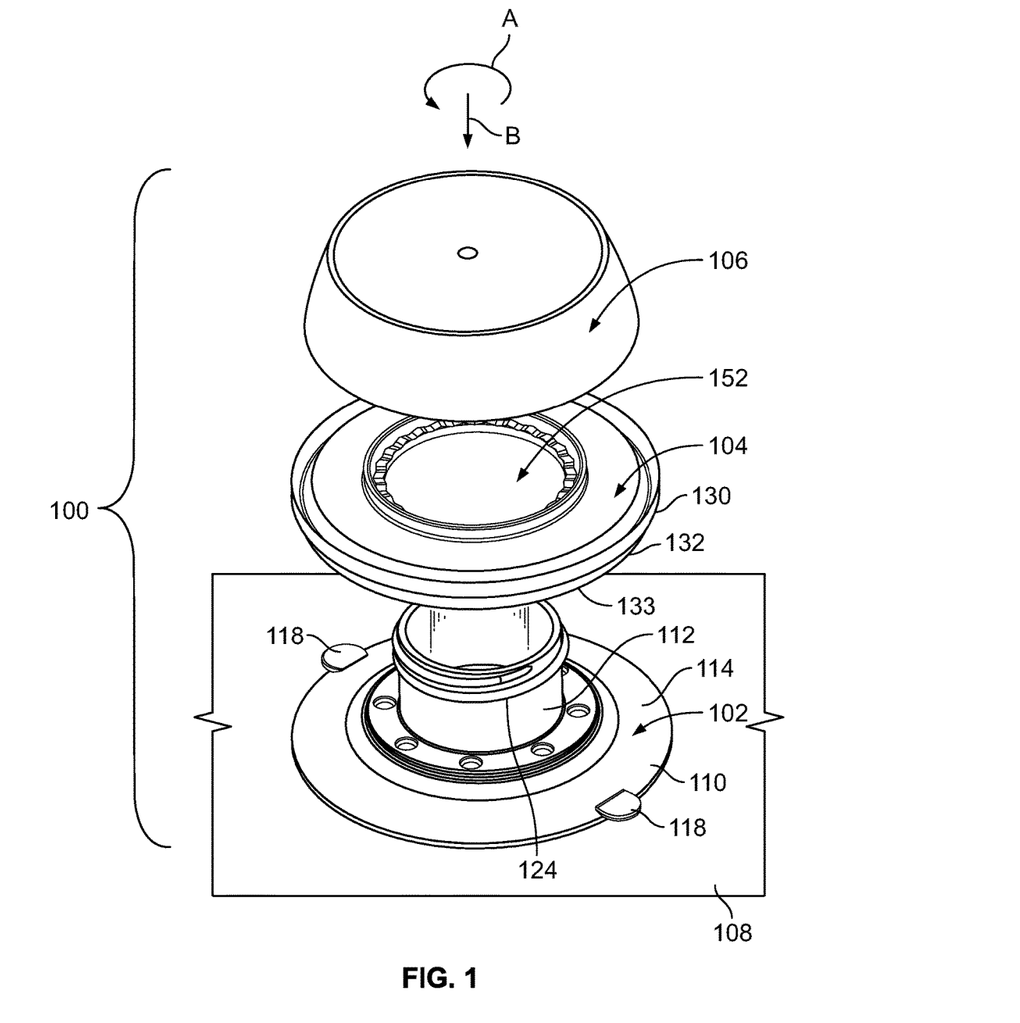
FIG. 1 illustrates a perspective exploded view of a securing assembly, according to an embodiment of the present disclosure.

FIG. 1 illustrates a perspective exploded view of a securing assembly 100, according to an embodiment of the present disclosure. The securing assembly 100 includes a suction cup 102, a locking member, such as a locking ring 104, and a suction securing nut 106. The suction cup 102 is configured to directly couple to a structure 108, such as a panel, wall, beam, or other such structure. The locking ring 104 couples to the suction cup 102. The suction securing nut 106 couples to the locking ring 104 and the suction cup 102.

Optionally, the locking member may be a non-ring like structure, such as one or more panels, or the like.

As shown, the locking ring 104 is disposed between the suction cup 102 and the suction securing nut 106. A portion of the locking ring 104 (such as a beveled rim 132) is configured to be urged into a portion of the securing nut 106 (such as an annular lip 114 of a suctioning base 110 as the suction securing nut 106 is tightened in relation to the suction cup 102. In at least one embodiment, an intermediate structure, such as a portion of a bracket or the like, may be disposed between the suction securing nut 106 and the locking ring 104, and/or the locking ring 104 and the suction cup 102.

Figure 2:
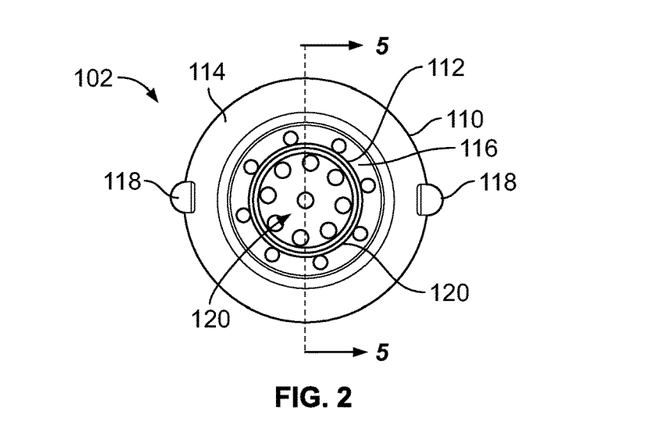
FIG. 2 illustrates a top view of a suction cup, according to an embodiment of the present disclosure.
Figure 3:
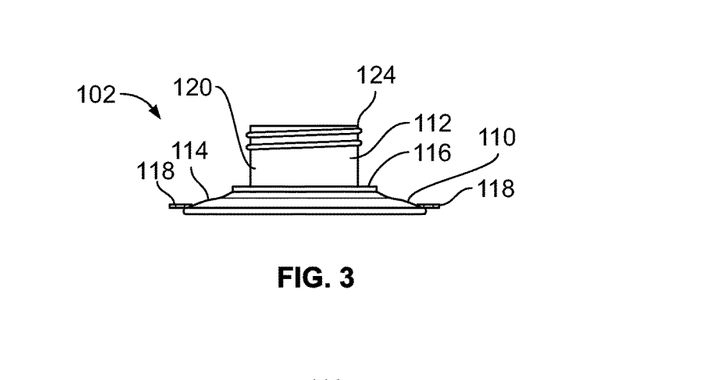
FIG. 3 illustrates a lateral view of the suction cup.
Figure 4:
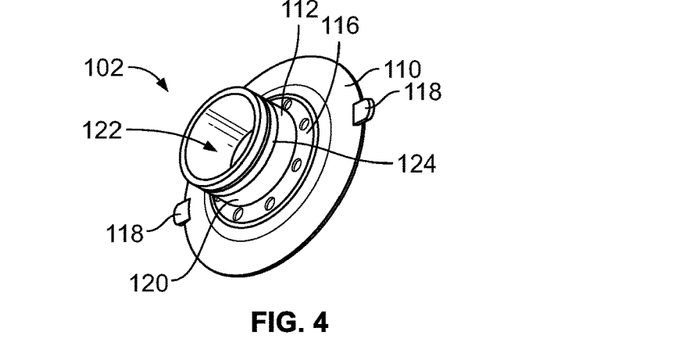
FIG. 4 illustrates a perspective top view of the suction cup.
Figure 5:
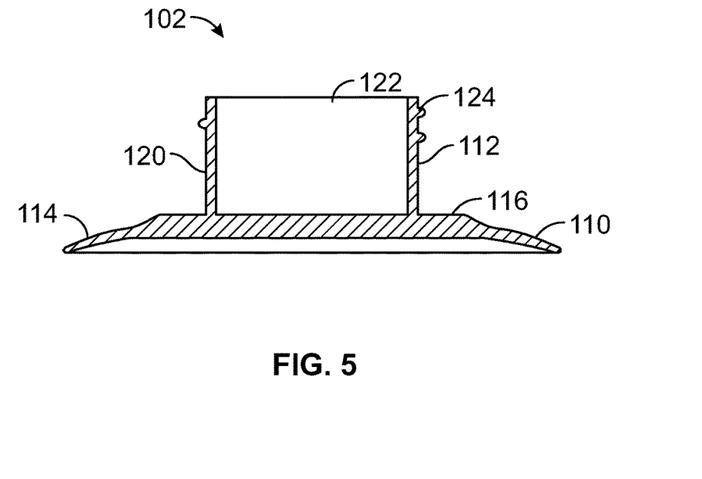
FIG. 5 illustrates a cross-sectional view of the suction cup through line 5-5 of FIG. 2.
Figure 6:
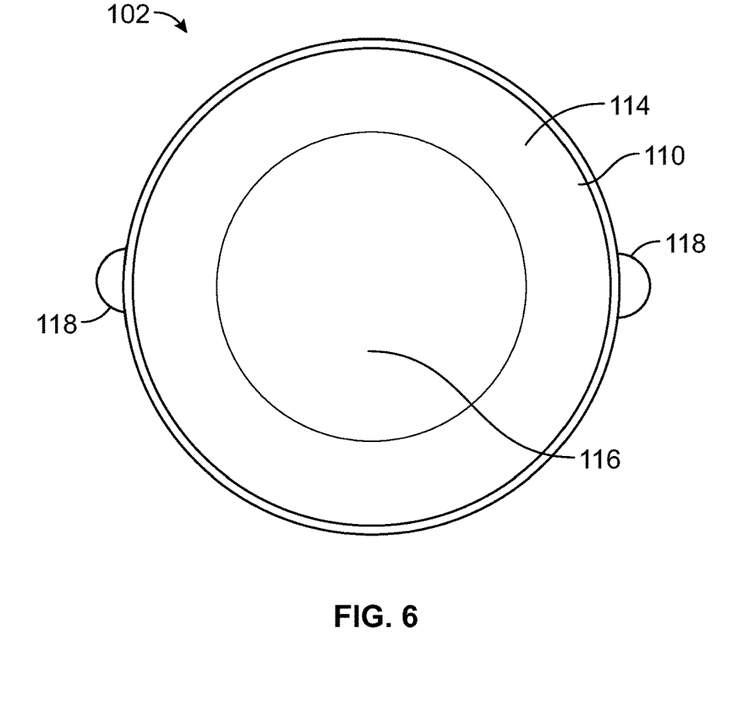
FIG. 6 illustrates a bottom view of the suction cup.

FIG. 2 illustrates a top view of the suction cup 102, according to an embodiment of the present disclosure. FIG. 3 illustrates a lateral view of the suction cup 102. FIG. 4 illustrates a perspective top view of the suction cup 102. FIG. 5 illustrates a cross-sectional view of the suction cup 102 through line 5-5 of FIG. 2. FIG. 6 illustrates a bottom view of the suction cup 102.

Referring to FIGS. 2-6, the suction cup 102 includes a suctioning base 110 integrally connected to a stem 112 extending upwardly from the suctioning base 110. The suctioning base 110 may include an outer annular lip 114 surrounding a flattened interior circular body 116. Pull tabs 118 may extend radially outward from outer edges of the annular lip 114. The pull tabs 118 are configured to be pulled outwardly from a surface to remove the suction cup 102 therefrom.

The stem 112 includes a cylindrical shaft 120 surrounding a central channel 122 that extends to the suctioning base 110. An outer surface of the shaft 120 may include threads 124 that are configured to threadably engage interior threads of the suction securing nut 106 (shown in FIG. 1).

Figure 7:
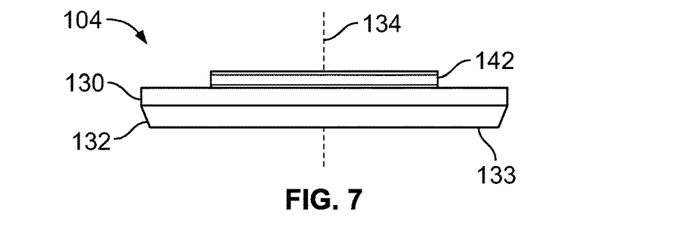
FIG. 7 illustrates a lateral view of a locking ring, according to an embodiment of the present disclosure.
Figure 8:
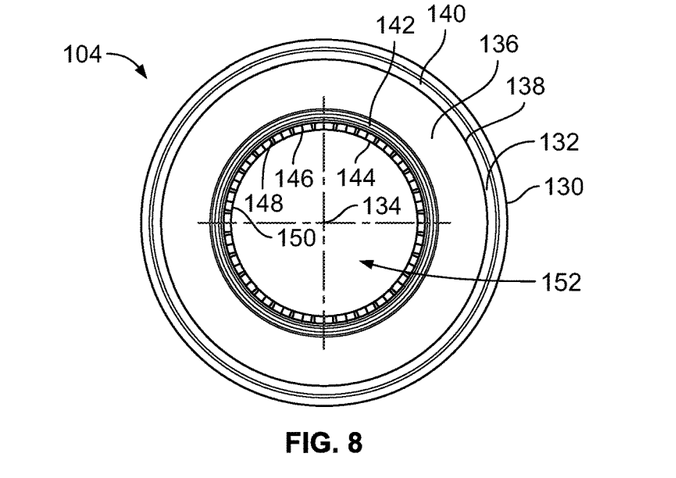
FIG. 8 illustrates a top view of the locking ring.
Figure 9:
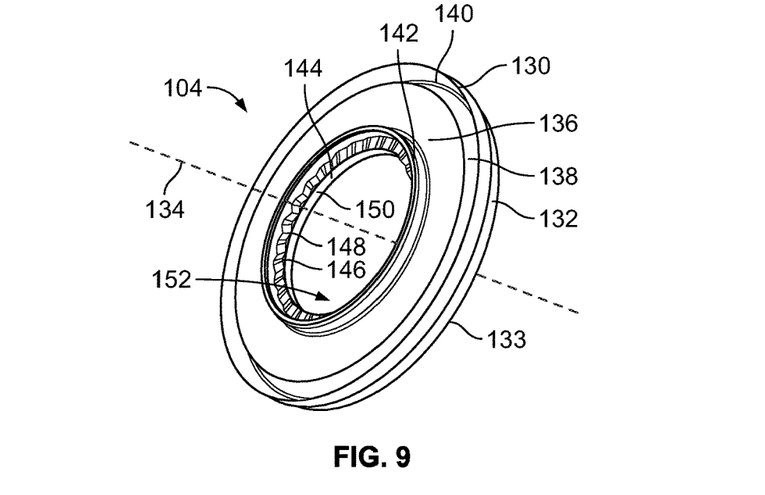
FIG. 9 illustrates a perspective top lateral view of the locking ring.

FIG. 7 illustrates a lateral view of the locking ring 104, according to an embodiment of the present disclosure. FIG. 8 illustrates a top view of the locking ring 104. FIG. 9 illustrates a perspective top lateral view of the locking ring 104.

Referring to FIGS. 7-9, the locking ring 104 includes an annular outer rim 130 and a beveled rim 132 extending downwardly from the outer rim 130. The beveled rim 132 inwardly cants from the outer rim 130 towards a central axis 134 of the locking ring 104. The inward cant angle of the beveled rim 132 may be greater or less than shown.

An inboard support base 136 connects to an inner diameter of the beveled rim 132 through an interior rim 138. The interior rim 138 may be coaxial with the outer rim 130. An interior groove 140 is formed between the outer rim 130, the beveled rim 132, and the interior rim 138.

An interior diameter of the inboard support base 136 connects to an interior upstanding annular wall 142, which upwardly extends from the support base 136. An interior ledge 144 inwardly extends from the annular wall 142 towards and about the central axis 134. The interior ledge 144 may be within one or more planes that are parallel to a plane of an upper surface of the support base 136. The interior ledge 144 may be serrated, and include a plurality of alternating peaks or teeth 146 and valleys or recesses 148 extending therearound. An interior edge 150 defines an internal circular passage 152. Alternatively, the interior ledge 144 may be smooth and flat, instead of serrated.

Referring to FIGS. 1-9, the locking ring 104 fits over the suction cup 102, such that the stem 112 passes through the passage 152 of the locking ring 104. A bottom edge 133 of the beveled rim 132 abuts into an upper surface of the annular lip 114 of the suctioning base 110.

Figure 10:
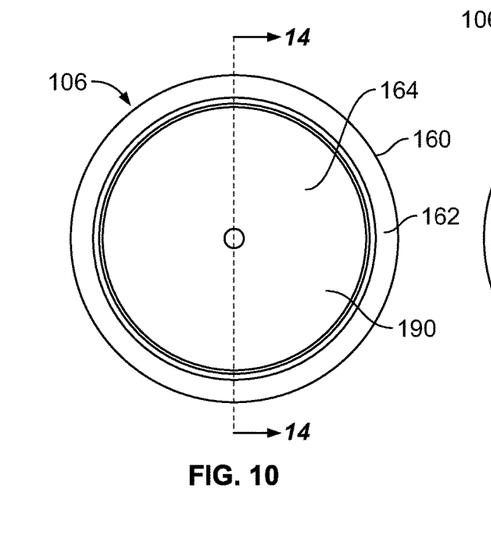
FIG. 10 illustrates a top view of a suction securing nut, according to. an embodiment of the present disclosure.
Figures 11, 13:
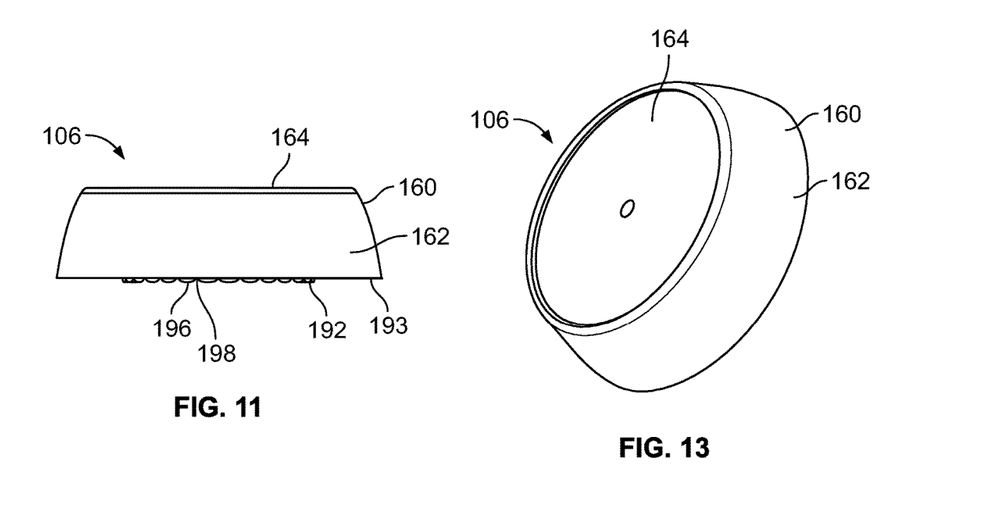
FIG. 11 illustrates a lateral view of the suction securing nut.
FIG. 13 illustrates a perspective top view of the suction securing nut.
Figure 12:
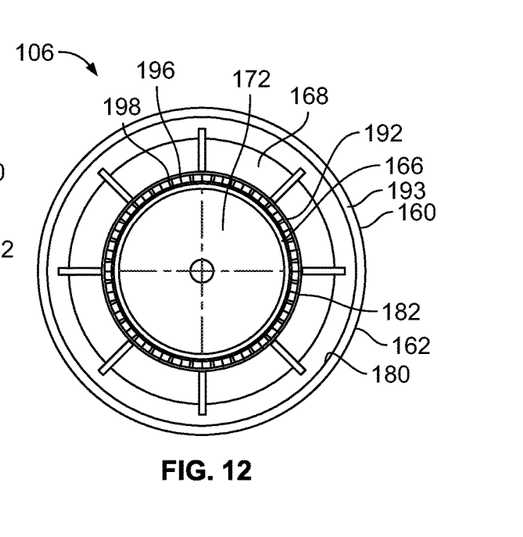
FIG. 12 illustrates a bottom view of the suction securing nut.
Figure 14:
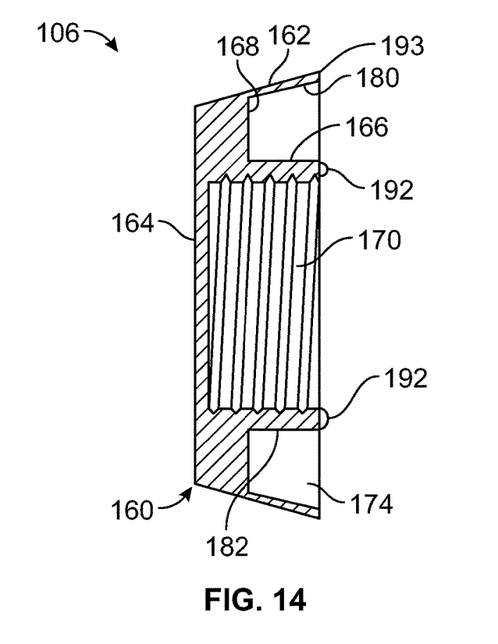
FIG. 14 illustrates a cross-sectional view of the suction securing nut through line 14-14 of FIG. 10.

FIG. 10 illustrates a top view of the suction securing nut 106, according to an embodiment of the present disclosure. FIG. 11 illustrates a lateral view of the suction securing nut 106. FIG. 12 illustrates a bottom view of the suction securing nut 106. FIG. 13 illustrates a perspective top view of the suction securing nut 106. FIG. 14 illustrates a cross-sectional view of the suction securing nut 106 through line 14-14 of FIG. 10.

Referring to FIGS. 10-14, the suction securing nut 106 includes an outer shroud 160 having an outer circumferential wall 162 connected to an outer cap 164. An interior connecting tube 166 extends inwardly from an interior surface 168 of the cap 164. The connecting tube 166 includes an interior threaded surface 170 surrounding a central chamber 172. An outer channel 174 is defined between an interior surface 180 of the wall 162 and an outer surface 182 of the connecting tube 166. Alternatively, the stem 112 of the suction cup 102 may include an interior threaded surface that threadably receives and engages an outer threaded surface of the connecting tube 166 of the suction securing nut 106.

An outer surface 190 of the cap 164 may be configured to support one or more graphics, such as advertisements, information, or the like. For example, a graphics display may be formed on the outer surface 190 of the cap 164. In at least one embodiment, graphics displays may be directly formed, etched, written, adhesively secured, and/or the like onto the outer surface 190 of the cap 164. In at least one other embodiment, a clear pocket may be formed over the outer surface 190, and the graphics display may be formed on a sheet of plastic, paper, or the like that is inserted between the outer surface 190 and an interior surface of the clear pocket.

As shown, a lower edge 192 of the interior connecting tube 166 may extend below a lower surface 193 of the outer circumferential wall 162. The lower surface 193 may be serrated and include a plurality of and include a plurality of alternating peaks or teeth 196 and valleys or recesses 198 extending therearound. The lower surface 193 of the interior connecting tube 166 is configured to couple to the interior ledge 144 of the locking ring 104 (shown in FIGS. 7-9), such that the peaks 196 and valleys 198 of the connecting tube 166 engage the peaks 146 and valleys 148 of the interior ledge 144 of the locking ring 104, thereby forcing the locking ring 104 into the suction cup 102. Alternatively, the lower surface 193 may be smooth and flat, instead of serrated.

Figure 15:
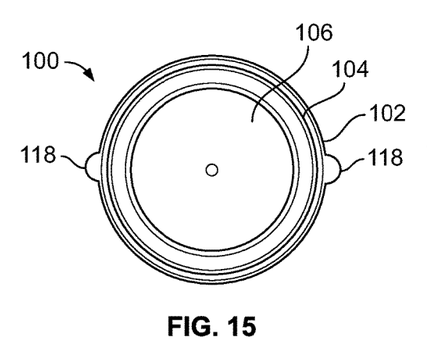
FIG. 15 illustrates a top view of the securing assembly.
Figures 16, 18:
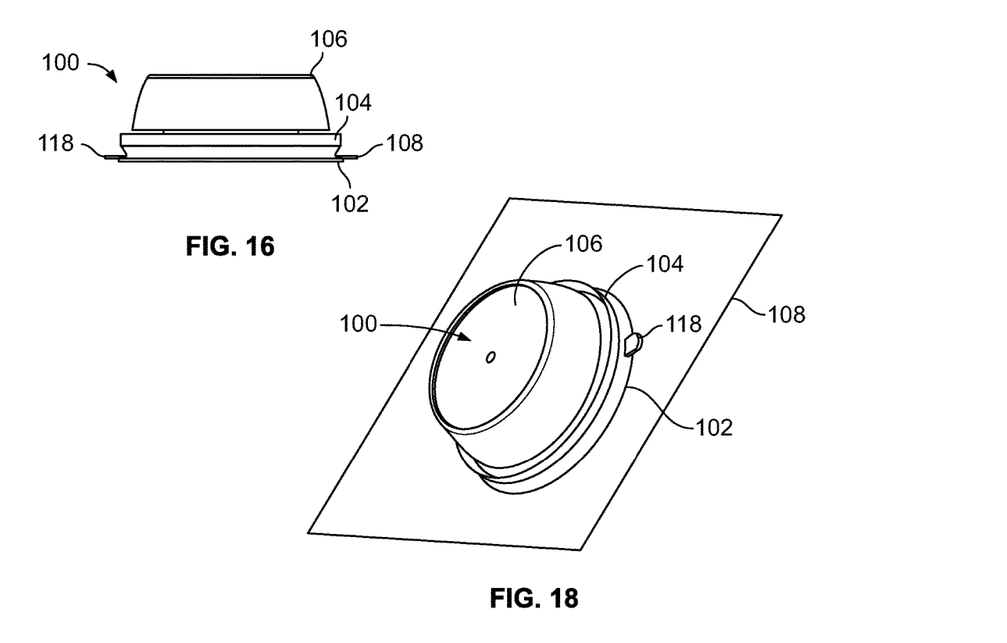
FIG. 16 illustrates a lateral view of the securing assembly.
FIG. 18 illustrates a perspective view of the securing assembly secured to a structure, according to an embodiment of the present disclosure.
Figure 17:
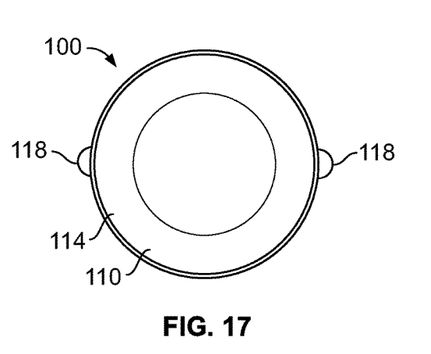
FIG. 17 illustrates a bottom view of the securing assembly.

FIG. 15 illustrates a top view of the securing assembly 100. FIG. 16 illustrates a lateral view of the securing assembly 100. FIG. 17 illustrates a bottom view of the securing assembly 100. FIG. 18 illustrates a perspective view of the securing assembly 100 secured to the structure 108.

Referring to FIGS. 1-18, after the locking ring 104 has been coupled to the suction cup 102, as described above, the suction securing nut 106 is axially aligned over the stem 112 of the suction cup 102. The section securing nut 106 is then urged onto the suction cup 102 such that the interior threaded surface 170 of the connecting tube 166 threadably engages the threads 124 of the stem 112. The suction securing nut 106 is then rotated in a securing direction A relative to the suction cup 102. As the suction securing nut 106 continues to be threaded in the securing direction A, the lower ledge 192 of the interior connecting tube 166 is forced into the interior ledge 144 of the locking ring 104, thereby forcing the locking ring downwardly towards the suction cup 102 in the direction of arrow B. The engagement of the alternating peaks and valleys of the lower ledge 192 and the interior ledge 144 may axially secure the suction securing nut 106 with respect to the locking ring 104 (such as via the peaks 196 of the lower ledge 192 mating into reciprocal valleys 148 of the interior ledge 144, and the peaks 146 of the interior ledge 144 mating into reciprocal valleys 198 of the lower ledge 192), so as to reduce slippage therebetween. As the suction securing nut 106 is tightened with respect to the stem 112, the bottom edge 133 of the beveled rim 132 of the locking ring 104 is forced into the annular lip 114 of the suctioning base 110, which causes the annular lip 114 to flatten. The flattening of the annular lip 114 provides a vacuum between the structure 108 and the suction cup 102. The locking ring 104 locks the suction cup 102 to the structure 108 via engagement with the securing nut 106. The securing nut 106 forces the locking ring 104 into the annular lip 114, flattening the annular lip 114 and forming a vacuum between the suction cup 102 and the structure 108, which forms a robust, strong, and reliable connection therebetween.

In order to remove the securing assembly 100 from the structure 108, the securing nut 106 is rotated in a direction that is opposite to the securing direction A (optionally, the securing direction A and the opposite direction may be reversed). As the securing nut 106 disengages from the stem 112 of the suction cup 102, the securing nut 106 disengages from the locking ring 104. As such, the force exerted by the locking ring 104 into the annular lip 114 decreases. The pull tabs 118 may then be pulled away from the structure 108, thereby removing the suction cup 102 therefrom.

As described herein, the suction cup 102, the locking ring 104, and the suction securing nut 106 may form the securing assembly 100. As the connecting tube 166 is rotated into a securing position with the stem 112, the locking ring 104 is forced into the annular lip 114 of the suctioning base 110, which greatly increases the suctioning force exerted by the suctioning base 110 (such as by drawing air out of the interface between the structure 108 and the suctioning base 110 to create a vacuum), thereby increasing the securing force between the securing assembly 100 and the surface of the structure 108. It has been found that by including the locking ring 104 in the securing assembly 100, increased suction retaining force is achieved with the surface of the component, such as a glass surface of a refrigerated compartment door. The resulting suctioning force achieved by operation of the locking ring 104 with the securing nut 106 and the suction cup 102 greatly exceeds that of a standard suction cup that is merely linearly pressed into a surface of a component.

Figure 19:
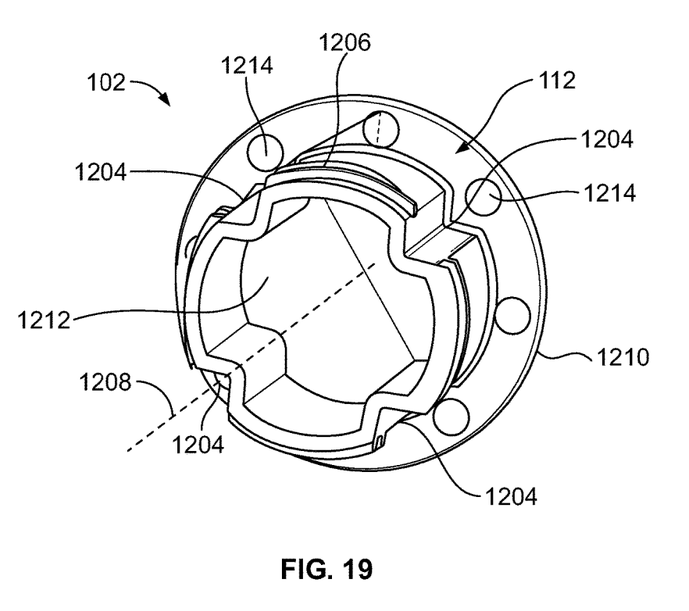
FIG. 19 illustrates a perspective top view of a stem of a suction cup, according to an embodiment of the present disclosure.

FIG. 19 illustrates a perspective top view of a stem 112 of a suction cup 1202, according to an embodiment of the present disclosure. Keying members 1204 may be formed through the stem 112. Outer surfaces of the stem 112 may include threads 1206, as described above. The keying members 1204 may be channels, indentations, divots, recessed areas, notches, slots, or the like, formed in an outer surface of the stem 112. Each keying member 1204 may be formed along a height of the stem 112 and may be parallel to a central axis 1208 of the stem 112. As shown, four evenly-spaced keying members 1204 are shown. Alternatively, more or less keying members than shown may be used.

The keying members 1204 provide alignment keys that are configured to receive reciprocal structures formed on a component, such as an accessory, bracket or the like, in order to maintain the component in a desired position. For example, securing mounts may include inwardly directed tabs extending into the passages. The tabs may be retained within the keying members 1204 to securely maintain a product holder system, for example, at a desired orientation. Any of the embodiments described herein may include the keying members 1204. Optionally, embodiments may not include the keying members 1204.

Additionally, a flange 1210 radially extends from a base 1212 of the stem 112. The flange 1210 may include one or more holes 1214 formed therethrough. More or less holes than shown may be used. A suctioning base (such as the suctioning base 110 may be secured over or otherwise onto the flange 1210. The holes 1214 are configured to allow the flexible material of the suctioning base to flow around and through the flange 1210, thereby providing an increased retaining interface, as well as providing a greater degree of flexibility to the suctioning base. Any of the embodiments described herein may include the holes 1214. Optionally, embodiments may not include the holes 1214.

Figure 20:
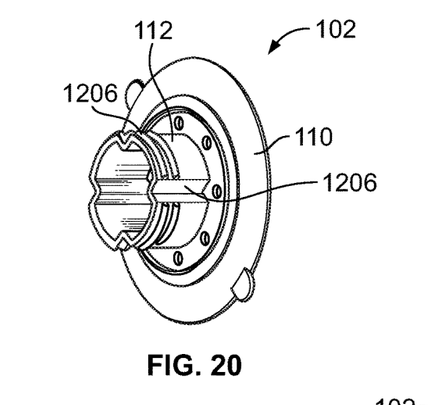
FIG. 20 illustrates a perspective view of a suction cup, according to an embodiment of the present disclosure.
Figure 21:
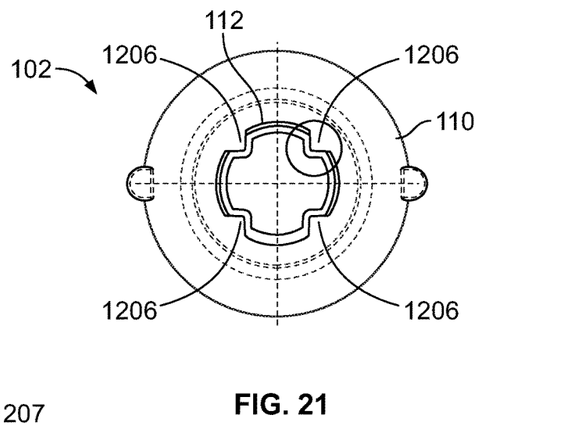
FIG. 21 illustrates a top view of a suction cup, according to an embodiment of the present disclosure.

FIG. 20 illustrates a perspective view of the suction cup 102, according to an embodiment of the present disclosure. FIG. 21 illustrates a top view of the suction cup 102. Referring to FIGS. 20 and 21, as shown, the suctioning base 110 is secured to the stem 112. The threads 1206 are formed on an outer surface of the stem 112, while the keying members 1204 are formed through portions of the stem 112.

Figure 22:
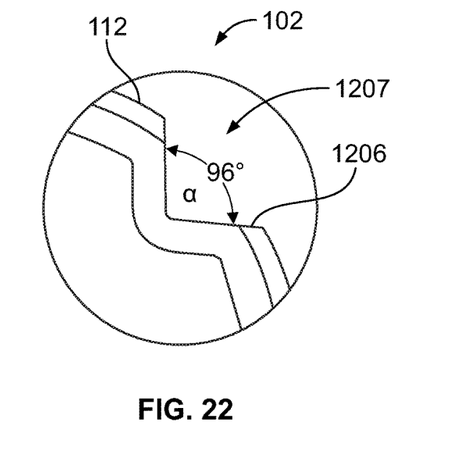
FIG. 22 illustrates a top view of a keying member of a suction cup, according to an embodiment of the present disclosure.

FIG. 22 illustrates a top view of a keying member 1206 of the suction cup 102, according to an embodiment of the present disclosure. As shown, the keying member 1206 may be an indented feature within the outer wall of the stem 112. The indentation 1207 may form an angle α that may conform to an outer surface of a mounting bracket of a component. For example, the angle α may be 96°. Alternatively, the angle α may be greater or less than 96°.

Figure 23:
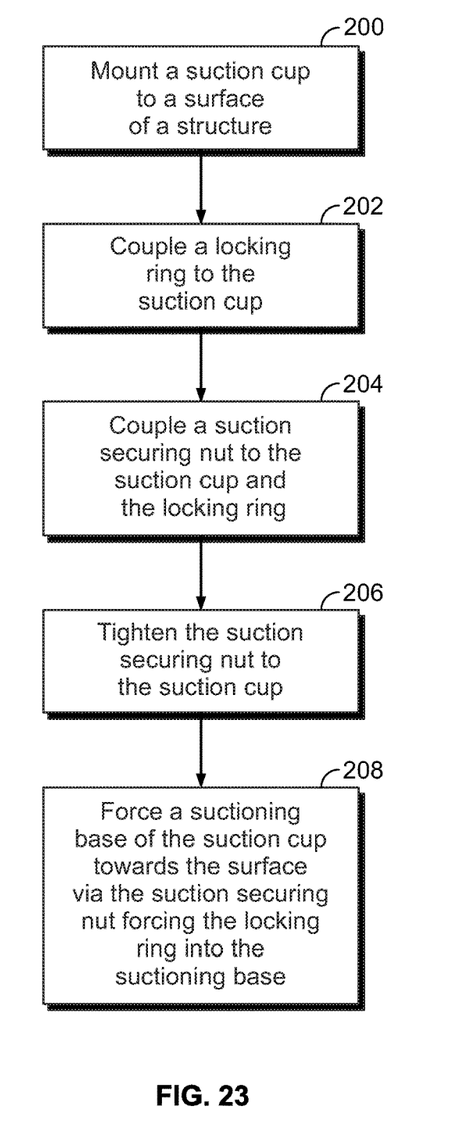
FIG. 23 illustrates a method of coupling a securing assembly to a surface of a structure, according to an embodiment of the present disclosure.

FIG. 23 illustrates a method of coupling a securing assembly to a surface of a structure, according to an embodiment of the present disclosure. Referring to FIGS. 1-23, at 200, the suction cup 102 is mounted to a surface of the structure 108. At 202, the locking ring 104 is coupled to the suction cup 102. At 204, the suction securing nut 106 is coupled to the suction cup 102 and the locking ring 104. At 206, the suction securing nut 106 is tightened in relation to the suction cup 102. At 208, the suctioning base 110 of the suction cup 102 is forced towards the surface of the structure 108 via the suction securing nut 106 forcing the locking ring 104 into the suctioning base 110.

In at least one embodiment, an intermediate structure, such as portion of a bracket, hanger, rope, string, and/or the like, may be disposed between the suction cup 102 and the locking ring 104, and/or the between the locking ring 104 and the suction securing nut 106. For example, a portion of a bracket may be hung around a portion of the suction cup 102 (such as the stem 112), a portion of the locking ring 104 (such as the rim 130), and/or a portion of the suction securing nut 106 (such as the wall 162).

In at least one embodiment, the securing assembly may secure to another component. For example, the securing assembly may be configured to secure to a bracket (such as a metal or plastic bracket) having a hole that is larger than a stem, for example, of the securing assembly. In this manner, the securing assembly may be retained by the bracket or a portion thereto.

As described herein, embodiments of the present disclosure provide a robust securing assembly that includes a suction cup. Embodiments of the present disclosure provide securing assemblies that provide a strong and reliable connection with a surface of a structure.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A securing assembly configured to removably secure a structure to a surface of a component, the securing assembly comprising:
   a suction cup;
   a locking member coupled to the suction cup, wherein the locking member is a locking ring comprising:
      an annular outer rim;
      a beveled rim extending from the outer rim;

an inboard support base that connects to the beveled rim through an interior rim, wherein an interior groove is formed between the outer rim, the beveled rim, and the interior rim;
an interior upstanding annular wall connected to the interior rim; and
an interior ledge that inwardly extends from the interior upstanding annular wall; and
a suction securing nut coupled to the suction cup and the locking member.

2. The securing assembly of claim 1, wherein rotation of the suction securing nut into a securing relationship with the suction cup urges a first portion of the locking member into a second portion of the suction cup and increases a suctioning securing force exerted into the surface of the component.

3. The securing assembly of claim 2, wherein the first portion is a beveled rim, and wherein the second portion is an annular lip of a suctioning base of the suction cup.

4. The securing assembly of claim 1, wherein the suction cup includes a stem having a first threaded surface, wherein the suction securing nut includes an outer shroud having an outer circumferential wall connected to an outer cap, and an interior connecting tube having a second threaded surface that is configured to threadably engage the first threaded surface of the stem.

5. The securing assembly of claim 4, wherein the stem comprises one or more keying members.

6. The securing assembly of claim 1, wherein the locking member is between the suction cup and the suction securing nut.

7. The securing assembly of claim 1, wherein the suction cup comprises a suctioning base integrally connected to a stem extending from the suctioning base, wherein the suctioning base includes an outer annular lip surrounding a flattened interior circular body, wherein the stem includes a cylindrical shaft surrounding a central channel that extends to the suctioning base, and wherein an outer surface of the shaft includes threads that are configured to threadably engage interior threads of the suction securing nut.

8. The securing assembly of claim 1, wherein the interior ledge includes a plurality of peaks and a plurality of valleys.

9. The securing assembly of claim 1, wherein the locking member fits over the suction cup such that a stem of the suction cup passes through a passage of the locking member.

10. The securing assembly of claim 1, wherein the suction securing nut comprises:
an outer shroud having an outer circumferential wall connected to an outer cap; and
an interior connecting tube extending inwardly from an interior surface of the cap, wherein the interior connecting tube includes an interior threaded surface surrounding a central chamber, wherein an outer channel is defined between the wall and the interior connecting tube, and wherein the interior threaded surface is configured to threadably engage an exterior threaded surface of a stem of the suction cup.

11. The securing assembly of claim 10, wherein a lower edge of the interior connecting tube extends below a lower surface of the outer circumferential wall.

12. The securing assembly of claim 11, wherein the lower edge of the interior connecting tube comprises a plurality of peaks and a plurality of valleys.

13. A securing assembly configured to removably secure a structure to a surface of a component, the securing assembly comprising:
a suction cup includes a stem having a first threaded surface, and a suctioning base having an annular lip;
a locking ring coupled to the suction cup, wherein the locking ring comprises:
a beveled rim, wherein the locking member fits over the suction cup such that the stem of the suction cup passes through a passage of the locking ring;
an annular outer rim, wherein the beveled rim extends from the outer rim;
an inboard support base that connects to the beveled rim through an interior rim, wherein an interior groove is formed between the outer rim, the beveled rim, and the interior rim;
an interior upstanding annular wall connected to the interior rim; and
an interior ledge that inwardly extends from the interior upstanding annular wall, wherein the interior ledge includes a first plurality of peaks and a first plurality of valleys; and
a suction securing nut coupled to the suction cup and the locking ring, wherein the locking ring is between the suction cup and the suction securing nut, wherein rotation of the suction securing nut into a securing relationship with the suction cup urges the beveled rim of the locking ring into the annular lip of the suction cup and increases a suctioning securing force exerted into the surface of the component by the suctioning base.

14. The securing assembly of claim 13, wherein the suction securing nut includes an outer shroud having an outer circumferential wall connected to an outer cap, and an interior connecting tube having a second threaded surface that is configured to threadably engage the first threaded surface of the stem.

15. The securing assembly of claim 13, wherein the suction securing nut comprises:
an outer shroud having an outer circumferential wall connected to an outer cap; and
an interior connecting tube extending inwardly from an interior surface of the cap, wherein the interior connecting tube includes an interior threaded surface surrounding a central chamber, wherein an outer channel is defined between the wall and the interior connecting tube, wherein the interior threaded surface is configured to threadably engage an exterior threaded surface of a stem of the suction cup, wherein a lower edge of the interior connecting tube extends below a lower surface of the outer circumferential wall, and wherein the lower edge of the interior connecting tube comprises a second plurality of peaks and a second plurality of valleys.

16. A securing assembly configured to removably secure a structure to a surface of a component, the securing assembly comprising:
a suction cup including a stem having a first threaded surface and one or more keying members;
a locking member coupled to the suction cup; and
a suction securing nut coupled to the suction cup and the locking member, wherein the suction securing nut includes an outer shroud having an outer circumferential wall connected to an outer cap, and an interior connecting tube having a second threaded surface that is configured to threadably engage the first threaded surface of the stem.

17. A securing assembly configured to removably secure a structure to a surface of a component, the securing assembly comprising:
a suction cup;
a locking member coupled to the suction cup; and a suction securing nut coupled to the suction cup and the locking member, wherein the suction securing nut comprises:
- an outer shroud having an outer circumferential wall connected to an outer cap; and
- an interior connecting tube extending inwardly from an interior surface of the cap, wherein a lower edge of the interior connecting tube extends below a lower surface of the outer circumferential wall, wherein the interior connecting tube includes an interior threaded surface surrounding a central chamber, wherein an outer channel is defined between the wall and the interior connecting tube, and wherein the interior threaded surface is configured to threadably engage an exterior threaded surface of a stem of the suction cup.

18. The securing assembly of claim 17, wherein the lower edge of the interior connecting tube comprises a plurality of peaks and a plurality of valleys.

* * * * *